United States Patent [19]

Bell

[11] Patent Number: 4,497,279

[45] Date of Patent: Feb. 5, 1985

[54] ANIMAL PLAY AND EXERCISE STRUCTURE

[76] Inventor: Audrey R. Bell, 5252 Blair Rd., Perry, Ohio 44081

[21] Appl. No.: 470,051

[22] Filed: Feb. 28, 1983

[51] Int. Cl.³ .................... A01K 15/00; A63B 17/04
[52] U.S. Cl. ................................ 119/29; 272/113
[58] Field of Search ............ 119/1, 17, 19, 29; 272/113, 1 R; 46/16, 27, 29; D30/41, 42; 182/178, 179; 52/638, 645, 657

[56] References Cited

U.S. PATENT DOCUMENTS

| | | | |
|---|---|---|---|
| 3,565,212 | 11/1969 | Johnson | 182/179 |
| 3,735,979 | 5/1973 | Levenberg | 272/113 |
| 3,897,055 | 7/1975 | Caldow | 272/113 |

FOREIGN PATENT DOCUMENTS 1126303 6/1982 Canada .

OTHER PUBLICATIONS

Kindgineered Play Structures, by Action Playgrounds, Inc., pp. 3-5.

*Primary Examiner*—Gene Mancene
*Assistant Examiner*—Kris R. Schulze
*Attorney, Agent, or Firm*—Cullen, Sloman, Cantor, Grauer, Scott and Rutherford

[57] ABSTRACT

An animal play and exercise structure designed to provide exercise, activity, and enjoyment indoors, particularly for a cat, while occupying a minimum amount of space. The structure includes two rigid vertically aligned frames. Each frame has four vertical supports and the supports have apertures therethrough. Side rods and ladder rods are inserted into the apertures interconnecting the supports to form each of the frames. Ramps are tied to the rods in an inclined manner by leather thongs. Platforms are also secured to the rods and the ramps provide the cat with access to the platforms. In the preferred embodiment, a decorative roof is attached onto the top frame.

11 Claims, 5 Drawing Figures

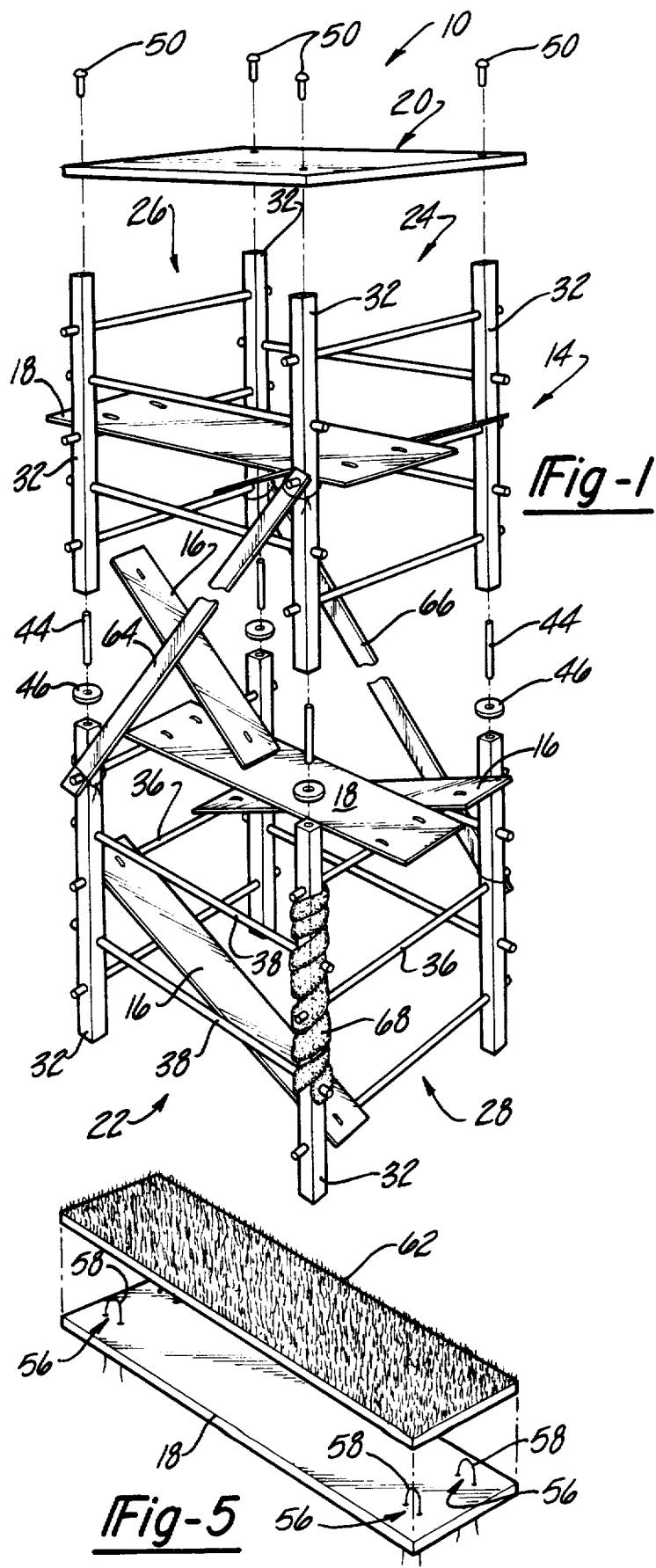
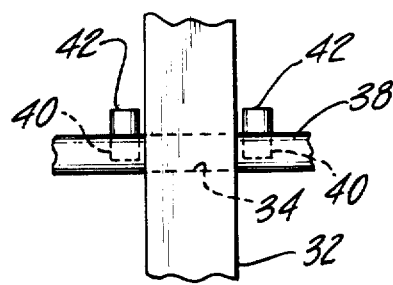
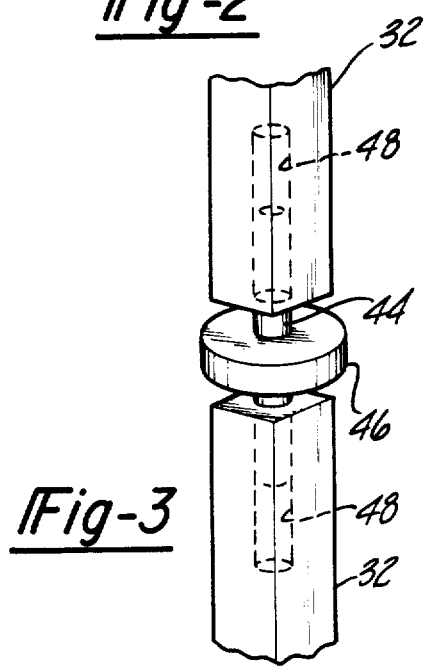
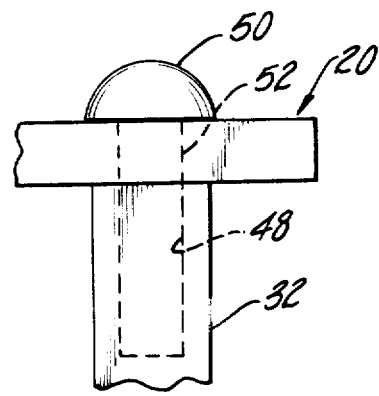

ANIMAL PLAY AND EXERCISE STRUCTURE

BACKGROUND OF THE INVENTION

The present invention relates to an animal play and exercise structure, and more particularly to a play and exercise structure for cats.

It is conventional to provide play and exercise structures, such as posts, poles and beams, for household pets. For example, poles having platforms or decks upon which the cat can climb and perch, are illustrated in U.S. Pat. Nos. 3,595,209; 3,479,991; and 3,479,990. Structures upon which cats can climb and sharpen their claws have also been suggested, as illustrated in U.S. Pat. No. 4,112,873.

The above structures have a distinct limitation in that they do not provide sufficient involvement or intrigue for the cat due to their simplicity and limited intricacy.

Structures of greater complexity and intracacy have, of course, been used as playground-type equipment upon which children may play and exercise. Such structures are large and sturdy to provide ample support for children and to eliminate the possibility of collapse, as illustrated in U.S. Pat. Nos. 3,897,055; 3,814,416; 2,206,581; and 1,765,361. Such structures are too large for use in the home by animals, particularly cats, and cannot be easily assembled or dismantled.

The prior art as described above has not yet recognized the need for a play and exercise structure which is intricate and complex, to satisfy and elicit a cat's innate tendencies of hiding, stalking, and climbing, and which occupies a minimum amount of space. Thus the structure must be not only complex for the animal, but also sufficiently compact so that the structure may be conveniently used in homes and in apartments. Despite the desired complexity of the structure for the animal, the structure should be of sufficiently simple construction so that it may be easily assembled and dismantled.

Finally, notwithstanding the simplicity of construction, the structure must be of sufficient strength and sturdiness to withstand the weight and force of a plurality of cats which may be climbing or pouncing on the structure.

SUMMARY OF THE INVENTION

The invention herein relates to an animal play and exercise structure designed to provide exercise, activity, and enjoyment, particularly for cats, which is compact, occupies a minimum amount of space, is complex for the animal and yet is of simple construction and easy to assemble and disassemble. Specifically, the structure includes a plurality of vertically aligned, open frames which are of generally rectangular configuration when viewed from above (i.e., a plan view). Each frame comprises a plurality of vertical supports with each support having apertures along its length. A plurality of horizontal rods are insertable into the apertures for interconnecting the supports so that the supports and rods form a frame. A plurality of lateral ramps each having a carpeted surface are tied to the rods by leather thongs. The ramps are tied to the horizontal rods on an incline relative the horizontal rod members to form a path or maze for the cat. Each frame may include a carpet-like covered bed or platform, and a decorative roof may be attached to the top of the uppermost frame.

The structure is intricate enough to elicit and satisfy the cat's innate tendencies of hiding, stalking, and climbing, thus providing exercise, activity, and enjoyment for the cat. A cat may also sleep on the beds and ramps or gaze outdoors from the carpet-covered beds if the structure is positioned near a window. Additionally, the structure may be easily assembled or dismantled and the ramps and beds may be rearranged to vary the path or maze of the play structure.

A scratching post is formed on one of the vertical supports, the scratching post being a long narrow piece of carpeting wrapped around a portion of one support.

DESCRIPTION OF THE DRAWINGS

The various objects, benefits, and advantages of the present invention will become more apparent upon reading the following detailed description of the invention taken in conjunction with the drawings. In the drawings, where like reference numerals identify corresponding components:

FIG. 1 is a perspective view of the animal play and exercise structure of the present invention;

FIG. 2 is a fragmentary view of the details of the means for maintaining the horizontal rods in the vertical supports;

FIG. 3 is a fragmentary view of the details of the means for connecting the frames in vertical alignment;

FIG. 4 is a fragmentary view of the details of the pegs for locking the roof to the uppermost frame; and FIG. 5 is a perspective view of a bed having a carpet-like surface and illustrating the thongs for attaching the bed to the horizontal rods.

DETAILED DESCRIPTION OF THE INVENTION

The animal play and exercise structure of the present invention, generally designated 10, includes a plurality of vertically aligned, open frames 12, 14, which are of generally rectangular configuration in plan view. Each frame may include one or more flat, elongated ramps 16, and flat elongated beds or platforms 18. An optional decorative roof 20 may be locked onto the top of the uppermost frame 14. Four ramps 16 and two beds 18 are illustrated, but it should be appreciated that more or fewer ramps 16 or beds 18 may be provided. The ramps 16 are preferably fastened to the frames on an incline to provide the cat with both exercise and easier access to the beds 18.

Each of the frames 12 and 14 is open on all four sides and thus each frame has a front 22, a back 24 and two opposed sides 26 and 28. Each frame has four rigid elongated vertical supports 32 defining the four vertical edges of the frame and the sides, front and back are each defined as the regions between two adjacent supports. Each support has a plurality of spaced-apart apertures 34 therethrough, all of which apertures have their axes perpendicular to the elongated axis of the vertical support. In the illustrated embodiment three apertures are spaced-apart and are on a first face of the support and two additional apertures are spaced apart on a second face of the support and offset from the apertures on the first face. Thus, the axes of the three apertures are perpendicular to the axes of the fourth and fifth apertures. This arrangement of apertures is for accommodating three side rods 36 on each side 26, 28 and two rods 38, referred to as ladder rods on both the front 22 and back 24 of each frame. The rods 36 and 38 are insertable into apertures 34 to interconnect the vertical supports to form frames 12 and 14.

In the preferred embodiment, the animal play and exercise structure is made of wood and occupies a floor space of only about 26"×22" with an overall height of 72". The vertical supports are 36" long. The ladder rods are 25 ½" long with the side rods being slightly longer, about 30". The overall size of the structure occupies a minimum amount of space.

Each rod 36 and 38 has four recesses 40 therein. The recesses are arranged in pairs, one pair near each end of each rod. The recesses of each pair are spaced apart a distance just slightly greater than the width of a vertical support 32. Means are provided for removably securing each rod end in an aperture 34 of the supports. Specifically, one end of a rod is inserted through an aperture 34 in a support 32 until two recesses 40 are on opposite sides of the support. Plug means 42 are then partially inserted into the recesses and frictionally, removably retained therein. The portion of each plug means which extends outwardly of each recess 40 is in sufficiently close proximity to the sides of the support 32 so as to prevent any substantial movement of the rod relative to the support 32.

As previously mentioned the frames 12, 14 are in vertical alignment. Means are provided for removably securing the freames in vertically aligned position. Specifically, pegs or dowels 44 and spacers 46 are provided for each vertical support 32. A bore 48 is provided in the top and bottom of each frame support 32. The spacers are thin, flat discs of circular configuration each having a central bore to receive a peg or dowel therein. Each peg is inserted into a spacer such that about half the exposed length of each peg is on each side of the spacer. The exposed peg ends are thereafter inserted into the bores 48 of corresponding vertically aligned supports 32 of upper and lower frame members and frictionally retained therein. The spacers 46 separate lower frame 12 from direct contact with upper frame 14.

In the preferred embodiment, the optional roof 20 is locked on to the top of upper frame 14 by locking pegs 50. Roof 20 is provided with four apertures 52, one at each corner of the roof, and the pegs 50 are inserted through apertures 52 and into bores 48 in each vertical support 32 for frictionally locking roof 20 on the upper frame 14.

The elongated, flat ramps 16 are provided with two pairs of orifices 56, one pair adjacent each of the ramp ends. Means are provided for removably securing the ramps to the side rods 36. Preferably a leather thong 58 is threaded through a pair of orifices 56 and the ends of the thong are tied around the adjacent side rod. Thus each ramp 16 preferably is secured to two side rods 36, one on each side 26, 28 of the frame to thus bridge the space between the frame sides. The ramps 16 are secured on an incline relative to the horizontal.

The flat, elongated beds or platforms 18 are provided with four pairs of orifices 56, one pair adjacent each corner of the bed. Means are provided for removably securing the beds to the side rods 36. Preferably, leather thongs 58 are used in the same manner that the thongs 58 are used for securing the ramps to the side rods. The beds or platforms are tied to opposed side rods 36 with the beds horizontally oriented. The ramps 16 and beds 18 are each provided with a carpet-like surface 62 which is wrapped around the edges of the ramp (or bed) and secured thereto such as by staples.

To provide structural integrity when two or more units are placed in vertical alignment the present invention includes, as part of the connecting means for securing frames to each other, a pair of stabilizer bars 64, 66. Each stabilizer bar is about 36" long and has two apertures therethrough, one at each end, and the apertures are sized to receive the rods 36 therein. One stabilizer 64 is secured on the front 22 of two frame units by angling the stabilizer so that one rod 36 of the lower frame 12 goes through the aperture at one end of the stabilizer and a rod 36 of the upper frame 14 goes through the aperture at the other end of the stabilizer. The stabilizer is then tied to the vertical supports by leather thongs. The second stabilizer 66 may be secured to the rear or back 24 of the structure in a similar fashion.

The present invention also includes a scratching post, specifically a carpet like member 68, wrapped around a vertical support. The carpet-like member is about 5 feet long and is wrapped around the support and tied to the support with leather thongs. The carpet-like member has a plurality of slits therein to allow the rods 36, 38 to extend therethrough.

The manner of use of the present invention by an animal such as a cat will now be explained. The cat may gain access to either of the beds 18 by climbing or moving up ramps 16 providing exercise, activity, and enjoyment for the cat. Cats may nap on the carpet-like covered beds 18, or gaze outdoors from the beds 18 if the structure is positioned near a window. Both clawed or declawed cats can play safely on the structure 10. The ramps and beds can be rearranged to provide a new maze by which the cat can gain access to the beds 18. The intricacies of the structure will enable the cat to satisfy its innate tendencies of hiding, stalking, and climbing. The animal play and exercise structure 10 can be easily assembled and dismantled because of the easily removable friction interfitting of the parts as previously described.

Another feature and benefit of the present invention is that no permanent fastening means are required.

The foregoing is a complete explanation of a preferred embodiment of the present invention. Various changes may be made without departing from the spirit of the invention. The invention, therefore, should be limited only by the following claims.

I now claim:

1. An animal play and exercise apparatus, especially for cats, comprising:
   a first and a second rigid frame, each frame having a plurality of vertical support members with bores in the ends thereof and a plurality of horizontal rod members;
   said support members each having a plurality of apertures, along its length;
   said rod members insertable into said apertures interconnecting said support members to form said first and said second frames;
   a plurality of recesses adjacent the ends of each of said rod members;
   a plurality of plugs insertable into said recesses, said plugs abutting said support members for maintaining said rod members in said apertures;
   a plurality of peg and ring-like spacer assemblies, with a spacer slidably disposed along each of said pegs;
   said pegs insertable into said bores in said first frame vertical support members and into bores in said second frame vertical support members interconnecting said first frame and said second frame in vertical alignment with said spacers separating said frames;

a plurality of lateral ramp members and at least one horizontal bed member;

a plurality of leather thongs connecting said ramp members to more than one of said rod members on an incline relative to said horizontal rod members; and a plurality of leather thongs connecting said bed members to more than one of said rod members horizontally relative to said rod members.

2. The apparatus of claim 1 further comprising a decorative lock-on roof; said roof locked onto said second frame top by a plurality of locking pegs; said locking pegs insertable through orifices in said roof and into said bores in the vertical support members of said second frame.

3. An animal play and exercise apparatus comprising:
a plurality of elongated vertical support members, each support member having a plurality of spaced-apart apertures therethrough, the apertures oriented perpendicular to the elongated axes of said vertical support members;

a plurality of horizontal rod members, said rod members insertable into said apertures for interconnecting said support members to form a first rigid four-cornered frame;

means for maintaining said rod members in said apertures for maintaining said frame relatively rigid;

a plurality of lateral ramp members;

first means for fastening each of said ramp members to more than one of said rod members on an incline relative said horizontal rod members;

a horizontal bed member; and second means for fastening said bed member to more than one of said rod members, horizontally oriented relative to said rod members;

additional vertical support members and horizontal rod members interconnected to form a second rigid frame;

at least one of said ramp members fastened by said first fastening means to one rod member associated with said first frame and to one of said rod members associated with said second frame; and means for connecting said second frame to said first frame with the vertical support members of said second frame in vertical alignment with the vertical support members of said first frame.

4. The apparatus of claim 3 wherein each of said first and said second fastening means includes a plurality of leather thongs.

5. The apparatus of claim 4 wherein said connecting means includes a plurality of pegs and ring-like spacers; and wherein said top of said first frame vertical support members and said bottom of said second frame vertical support members each have a plurality of bores therein; each spacer slidably disposed along one of said pegs; each of said pegs inserted into said corresponding bores in said first frame and inserted into said corresponding bore in said second frame with said spacers separating said frames.

6. The apparatus of claim 3 wherein said maintaining means includes at least two plugs;
at least one of said rod members having a plurality of recesses adjacent each rod member end; and
each of said plugs disposed in one corresponding recess adjacent to said vertical support member and each said plug abutting said support member for maintaining said rod member within said aperture.

7. The apparatus of claim 3 and further comprising a decorative lock on roof; and
means for locking said roof to the top of said second frame.

8. The apparatus of claim 7 wherein said locking means includes a plurality of locking pegs; said roof has a plurality of orifices; said top of said second frame vertical support members each have a bore;
said roof being locked to said second frame by said locking pegs disposed through said orifices and into said corresponding bores.

9. The apparatus of claim 3 wherein at least one of said ramp members has a carpet-like surface.

10. The apparatus of claim 3 wherein at least one of said bed members has a carpet-like surface; and
means for securing said carpet-like surface to said bed.

11. An animal play and exercise apparatus, especially for cats, comprising:
a first and a second rigid frame, each frame having a plurality of vertical support members with bores in the ends thereof and a plurality of horizontal rod members;

said support members each having a plurality of apertures, along its length;

said rod members insertable into said apertures for interconnecting said support members to form said first and said second frames;

means adjacent the ends of each of said rod members for maintaining said rod members in said apertures;

pegs insertable into said bores in said first frame vertical support members and into bores in said second frame vertical support members for interconnecting said first frame and said second frame in vertical alignment with spacers slidably received along each peg separating said frames;

a plurality of lateral ramp members and at least one horizontal bed member;

said ramp members being connected to more than one of said rod members on an incline relative to said horizontal rod members; and said bed member being connected to more than one of said rod members horizontally relative to said rod members.

* * * * *